United States Patent
Millet et al.

(10) Patent No.: US 10,899,470 B2
(45) Date of Patent: Jan. 26, 2021

(54) MULTIFUNCTIONAL AIRCRAFT LANDING LIGHT WITH STATIC FUNCTION SWITCHING

(71) Applicant: ZODIAC AERO ELECTRIC, Montreuil (FR)

(72) Inventors: Philippe Millet, Chaville (FR); Claude Doule, Paris (FR); Christian Tsao, Rosny sous Bois (FR)

(73) Assignee: ZODIAC AERO ELECTRIC, Montreuil (FR)

( * ) Notice: Subject to any disclaimer, the term of this patent is extended or adjusted under 35 U.S.C. 154(b) by 0 days.

(21) Appl. No.: 16/343,685

(22) PCT Filed: Oct. 17, 2017

(86) PCT No.: PCT/EP2017/076392
§ 371 (c)(1),
(2) Date: Apr. 19, 2019

(87) PCT Pub. No.: WO2018/073196
PCT Pub. Date: Apr. 26, 2018

(65) Prior Publication Data
US 2019/0241279 A1    Aug. 8, 2019

(30) Foreign Application Priority Data
Oct. 19, 2016    (FR) ..................... 16 60144

(51) Int. Cl.
*B64D 47/02*    (2006.01)
*F21S 41/663*    (2018.01)
(Continued)

(52) U.S. Cl.
CPC ............. *B64D 47/02* (2013.01); *B64D 47/04* (2013.01); *F21S 41/143* (2018.01);
(Continued)

(58) Field of Classification Search
None
See application file for complete search history.

(56) References Cited

U.S. PATENT DOCUMENTS

2007/0041207 A1* 2/2007 Ishida ............... B60Q 1/0041
                                                  362/538
2011/0164429 A1* 7/2011 Heym .................. B60Q 3/44
                                                  362/471
(Continued)

FOREIGN PATENT DOCUMENTS

DE    10 2012 002 458 A1    8/2012
EP       1 403 135 A2       3/2004
(Continued)

OTHER PUBLICATIONS

International Search Report dated Nov. 20, 2017, issued in corresponding International Application No. PCT/EP2017/076392, filed Oct. 17, 2017, 3 pages.

*Primary Examiner* — Ashok Patel
(74) *Attorney, Agent, or Firm* — Christensen O'Connor Johnson Kindness PLLC

(57) ABSTRACT

An aircraft landing light with static function switching for producing at least two beams having different characteristics, in particular different orientations and/or openings, comprises an array of light-emitting diode lighting modules (6) each comprising at least two sets of at least one light source (S1, S2), operable selectively and statically to provide at least one of the lighting functions. Each lighting module (6) comprises a common converging lens (L) for the light sources, the converging lens comprising a light input optical surface (Li) and a light output optical surface (L₂), said light sources being positioned in relation to the light input optical surface.

7 Claims, 14 Drawing Sheets

(51) Int. Cl.
  *F21S 41/143* (2018.01)
  *F21S 41/265* (2018.01)
  *B64D 47/04* (2006.01)
  *F21W 107/30* (2018.01)
  *F21S 41/153* (2018.01)
  *F21Y 115/10* (2016.01)

(52) U.S. Cl.
  CPC ........... *F21S 41/153* (2018.01); *F21S 41/265* (2018.01); *F21S 41/663* (2018.01); *B64D 2203/00* (2013.01); *F21W 2107/30* (2018.01); *F21Y 2115/10* (2016.08)

(56) References Cited

U.S. PATENT DOCUMENTS

| | | |
|---|---|---|
| 2013/0094210 A1 | 4/2013 | Rice |
| 2016/0068276 A1* | 3/2016 | Tsao .................... G02B 19/0061 362/470 |
| 2016/0076722 A1* | 3/2016 | Hessling von Heimendahl .......... B64D 47/04 362/470 |
| 2016/0091150 A1* | 3/2016 | Camp, III ............... F21V 13/04 362/328 |
| 2016/0146442 A1* | 5/2016 | Fong .................... H01R 12/714 362/363 |
| 2016/0238208 A1 | 8/2016 | Wang |

FOREIGN PATENT DOCUMENTS

| | | |
|---|---|---|
| EP | 2 995 501 A1 | 3/2016 |
| FR | 2 889 869 A1 | 2/2007 |
| FR | 3 013 331 A1 | 5/2015 |
| FR | 3 025 285 A1 | 3/2016 |

* cited by examiner

Rendement optique
sur champ de 10° x 7° = 52 %

Rendement optique
sur champ de 10° x 7° = 52,4 %

Rendement optique
sur champ de 10° x 7,2° = 51,7 %

Rendement optique
sur champ de 10° x 7° = 52 %

MULTIFUNCTIONAL AIRCRAFT LANDING LIGHT WITH STATIC FUNCTION SWITCHING

TECHNICAL FIELD

Embodiments of the present disclosure relate to an aircraft light capable of generating a plurality of lighting functions.

Aircraft of large size are equipped with landing lights, often located under the wings, and takeoff lights, often fastened to the strut of the front landing gear, which lights are used successively or simultaneously in order to allow the pilot to identify the path to follow at night. They are also equipped with one or more taxiing lights enabling medium-distance illumination when the airplane is taxiing on the runway.

The landing and takeoff lights are extremely powerful in order to ensure a sufficient range, of about 200 to 500 meters. They are capable of delivering several hundred thousand candelas. The beams produced by taxiing lights are approximately 10 times less intense but produce a beam of much greater spread.

The light beams produced by landing and takeoff lights are identical but have different orientations. Taxiing lights for their part have substantially the same orientation as takeoff lights, but a larger horizontal angular aperture.

Specifically, in the approach phase, before landing, the axis of the beam of the landing lights is pointed downward toward the runway with an angle inclined with respect to the axis of the fuselage of the airplane. This angle differs depending on the type of airplane, and may vary from 6 to 13°.

During the takeoff phase, and more precisely when all the wheels of the airplane are in contact with the ground, the takeoff and taxiing lights must point as far-off as possible in front of the airplane, and hence the light beam is substantially parallel to the ground and to the axis of the fuselage of the airplane.

Thus, the axis of a landing beam is directed downward, for example by an angle comprised between −13 degrees and −6 degrees with respect to the axis of the fuselage of the aircraft, whereas the axis of a takeoff beam or the axis of a taxiing light also points downward but by a lesser angle, for example comprised between −3 degrees and −0.5 degrees with respect to the axis of the fuselage.

BACKGROUND

In the prior art, these various airplane lighting functions are generated by separate lights that are capable of emitting light beams the intensity distribution and pointing direction of which meet the visibility needs of pilots.

Thus, landing, takeoff and taxiing lights are separate lighting units, this contributing to increasing the total weight of the on-board lighting system of an aircraft. However, as is known, in the field of aeronautics, weight is a critical parameter.

Moreover, the power consumption, bulk and number of sites that must be provided to generate sufficient lighting with respect to the required performance, create a notable installation and power-supply constraint.

SUMMARY

The aim of the disclosure is therefore to mitigate these drawbacks and to provide a multifunction aircraft light. It may for example be a question of generating takeoff-, landing- and taxiing-light functions.

The subject of the invention disclosure is therefore an aircraft landing light with static function switching, intended to produce at least two beams having different characteristics, in particular different orientations and/or different apertures, comprising an array of LED lighting modules that each comprise at least two sets of at least one selectively and statically activatable light source in order to generate at least one of the lighting functions.

This light comprises a convergent lens that is common to the light sources, the convergent lens comprising a light entrance dioptric interface and a light exit dioptric interface, the light sources being positioned with respect to the light entrance dioptric interface. This optical principle differs from the optical solutions generally used in this type of light, namely collimators making use of total reflection or parabolic mirrors.

Light-emitting diodes (LEDs) devoid of lenses will preferably be used because the coupling to the convergent lens is simplified and therefore a better performance is obtained.

In one embodiment, the light sources are off-axis with respect with respect to an axis of the lens so as to generate either beams of different orientation or beams of different aperture, or beams of different orientation and aperture, the light sources being off-axis with respect to the axis of the lens so that the beams mutually diverge by 5 to 30°.

Provision may be made for the convergent lens to possess an entrance dioptric interface the profile of which is planar or spherical on the whole and an exit dioptric interface the profile of which is elliptical or aspherical, the focal plane of the convergent lens being located at a distance from the entrance dioptric interface smaller than 10 mm.

In one method of implementation, the entrance dioptric interface has a shape that is planar on the whole and comprises a disk-shaped central dioptric area, an annular exterior dioptric area and a frustoconical toroidal median area placed between the central and exterior areas.

According to another feature of the light according to the invention disclosure, the light sources are defocused with respect to the lens by being brought closer to the entrance dioptric interface.

In one embodiment, the lens is catadioptric and comprises a dioptric central zone in which the light sources are placed and a conical or parabolic exterior annular zone that reflects light by total reflection.

Provision may be made for the light sources to be mounted on a printed circuit board and for the lens to comprise feet for fastening and positioning the lens on the board.

According to yet another feature of the light according to the invention disclosure, the light comprises an optical device comprising a set of grouped convergent lenses each associated with at least two sets of at least one light source.

The subject of the invention disclosure is also, according to another aspect, the use of an aircraft light such as defined above, to produce a landing, taxiing or takeoff light.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
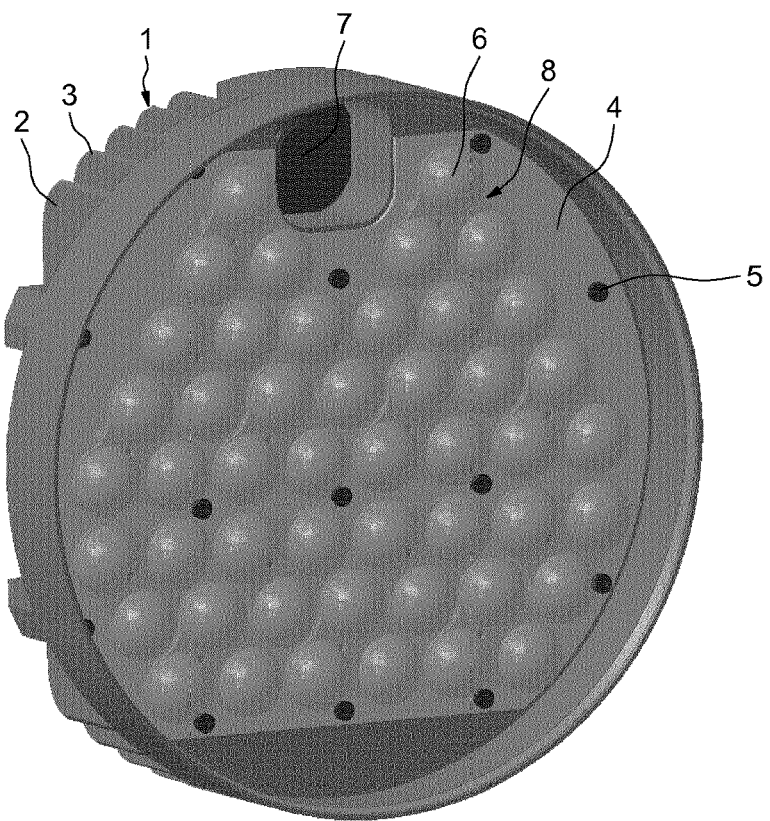
FIGS. 1 and 2 are perspective views of two embodiments of a multifunction light according to the disclosure.
Figure 2:
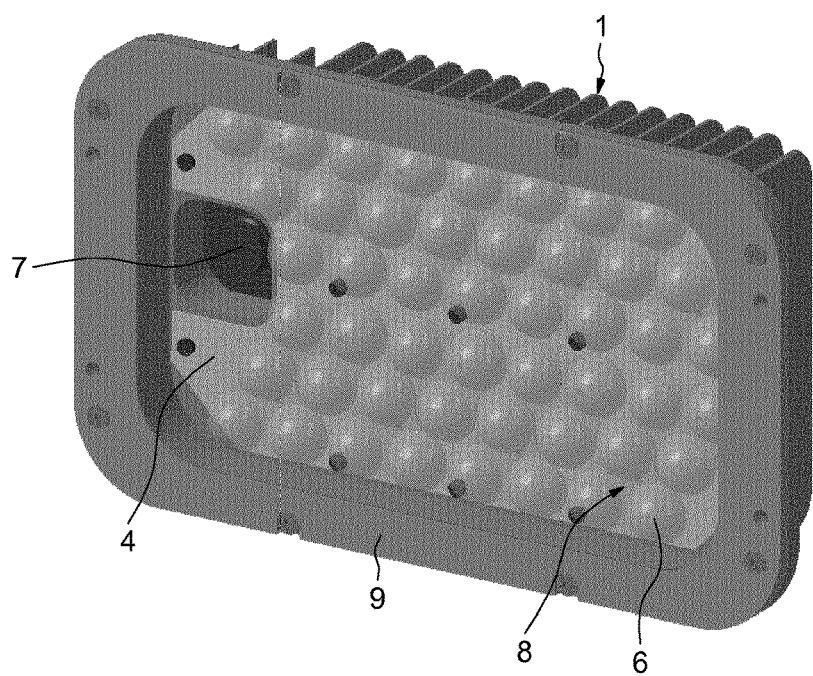

Reference will firstly be made to FIGS. 1 and 2, which illustrate the general structure of a double-function light according to the disclosure, the light being referenced by the general reference number 1.

This light comprises: a metal body 2 provided, on its rear face, with cooling fins 3; a printed circuit board 4 mounted on the front face, and advantageously screwed in several places to the body 2 using screws such as 5, in order to ensure a good dissipation of heat; and an array of lighting devices 6 mounted on the printed circuit board 4.

The assembly is capped by an outer lens (not shown) that is transparent to light and is supplied with power by means of a connector 7.

In the two embodiments illustrated in FIGS. 1 and 2, the printed circuit board 4 comprises 16 lighting devices, referenced 8, each comprising 3 lighting modules, i.e. 48 lighting modules in total.

In the embodiment of FIG. 1, the light has a circular shape and the standard size PAR 64, corresponding to a diameter of 8 inches or 203 millimeters, the size of lights generally being designated by their PAR number in ⅛ inches.

In the embodiment in FIG. 2, the light has a rectangular shape, the outer lens being fastened to a front flange 9.

Figure 3:
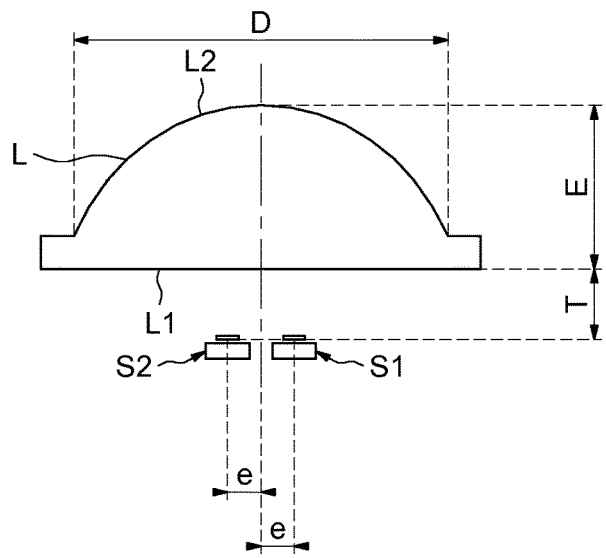
FIG. 3 is a schematic overview illustrating a first embodiment of a lighting module for a light according to the disclosure.

With reference to FIG. 3, each lighting module 6 comprises a convergent lens L comprising a light entrance dioptric interface L1 and an exit dioptric interface L2, and two light sources S1 and S2, here light-emitting diodes (LEDs), placed facing the light entrance dioptric interface L1. These diodes each correspond to one function of the light and are intended to be selectively activatable with identical diodes of the other lighting modules, depending on the flight phase. Thus, one of the diodes of each module delivers a landing beam, the other delivering a takeoff beam. These diodes are off-axis with respect to the axis of the lens, so as to obtain an angular shift of the delivered beams.

The two sources S1 and S2 define a planar emitting area, placed at a distance T from the entrance dioptric interface L1. This distance T corresponds to the register adopted to form an approximate image of the sources. The two sources S1 and S2 are positioned at a distance e that represents the off-axisness of the center of the sources with respect to the axis of revolution of the lens L.

As may be seen, the lens L has a thickness E and a useful diameter D. In the embodiment illustrated in FIG. 3, the entrance dioptric interface is planar whereas the exit dioptric interface L2 is elliptical.

Figure 4:
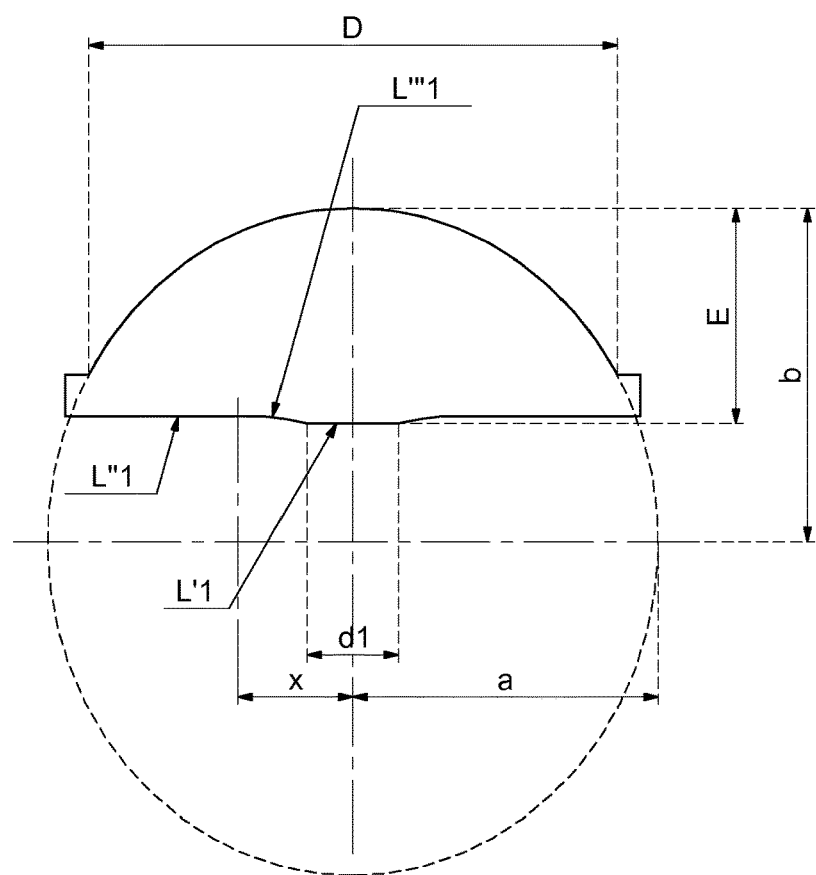
FIG. 4 illustrates a variant embodiment of the lens of the lighting module of FIG. 3.

In another embodiment, illustrated in FIG. 4, the entrance dioptric interface remains generally planar but comprises a disk-shaped central dioptric area $L'_1$ of diameter d1, an annular external dioptric area $L''_1$ that is coaxial with the central area $L'_1$, and a median area $L'''_1$ placed between the central area and the exterior area.

As may be seen, the exterior dioptric area is set back with respect to the central area by being shifted toward the exit surface, the median area $L'''_1$ having a frustoconical toroidal shape.

This embodiment, in which the light entrance surface $L_1$ comprises two areas, a central area and an exterior area respectively, and also a frustoconical toroidal median area, is advantageous in so far as it allows the distortion of the image of the sources, i.e. the image formed by the lens, to be decreased.

Figure 5A:
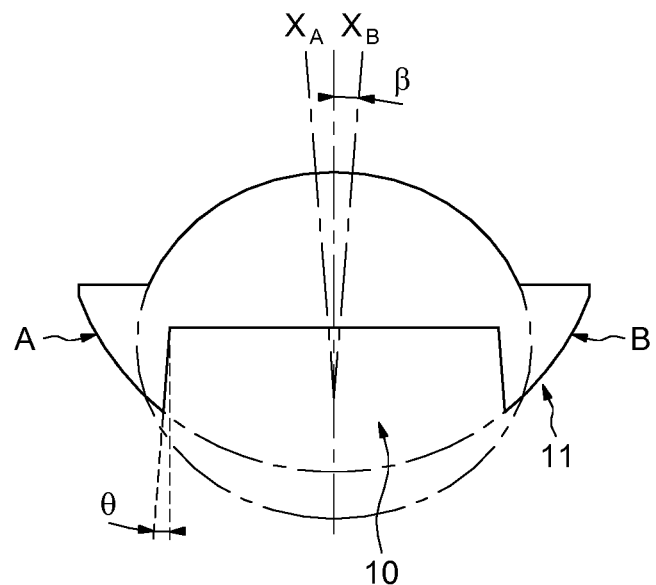
FIGS. 5a, 5b and 5c illustrate another embodiment of a lens of a lighting module for a light according to the disclosure.
Figure 5B:
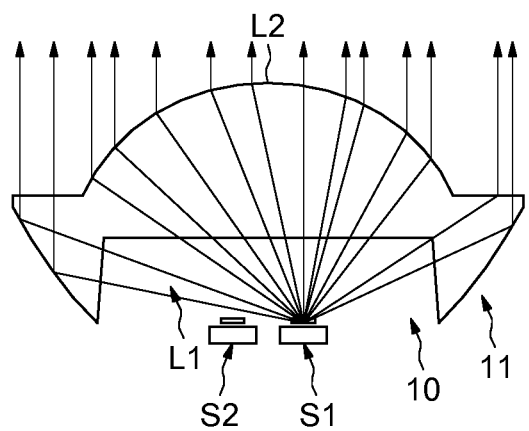
Figure 5C:
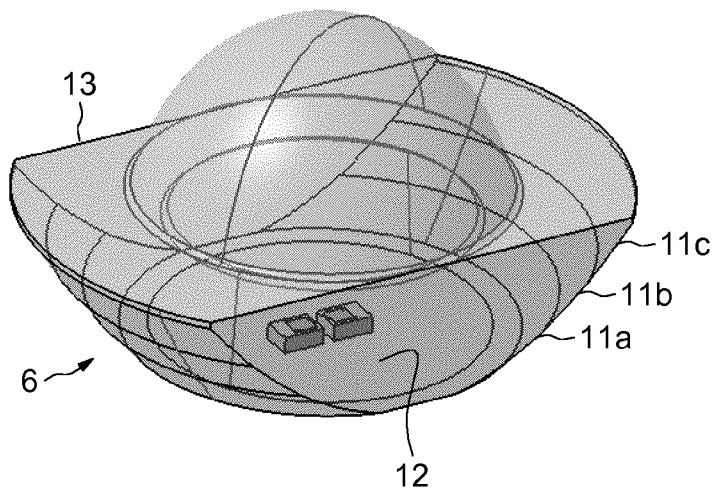

In the embodiment of FIGS. 5a, 5b and 5c, the lens is catadioptric. In the present case it comprises a dioptric central zone 10 that transmits the light emitted by the sources as described above, and a peripheral zone 11 forming a reflector that reflects the light emitted by the sources that does not pass through the dioptric central zone. The reflector works on the principle of total reflection inside matter.

Since the reflector is annular, it possesses at its center a void in which the sources S1 and S2 are housed (FIG. 5b).

The light-reflecting exterior zone 11 has a parabolic or conical shape and forms a light collector that is positioned in the peripheral zone of the lens in order to capture the light rays emitted by the diodes that do not enter directly into the lens. It thus allows the luminous efficacy of the lens and peak intensity to be increased.

For example, as illustrated in FIG. 5c, the parabolic exterior zone may take the form of a succession of juxtaposed frustoconical sections 11a, 11b, and 11c approaching the parabolic profile. Provision will possibly and advantageously be made for lateral flats 12 and 13 in order to decrease the overall size of the lens, it being possible to remove some of the collector without decreasing its effectiveness. In this case, as illustrated, the lens comprises two opposite reflective areas 11.

As FIG. 5a shows, the void in which the light sources S1 and S2 are located has an overall frustoconical shape, the peripheral surface of the void being inclined by an angle θ with respect to an axis parallel to an axis of revolution of the lens. Moreover, it is advantageous to disassociate the reflective surfaces positioned facing each of the two sources by inclining the axis of the generatrixes $X_A$ and $X_B$ of the parabolas A and B of the two exterior surfaces 11 with respect to the optical axis of the lens by an angle β in order to superpose the image of the source produced via the central dioptric channel and the image produced by the exterior channel functioning in total reflection.

As indicated above, the light preferably comprises an array of lighting devices each comprising a plurality of lighting modules each comprising at least two selectively activatable LED light sources.

In the example embodiments illustrated in FIGS. 6a to 6d, each lighting device comprises three lighting modules.

Each lighting device here comprises, for each module, two light sources S1 and S2, here light-emitting diodes, and comprises a common optical device 14 (illustrated in FIGS. 6a and 6b) here comprising three lenses L that are each associated with one pair of diodes S1 and S2.

The diodes S1 and S2 of each group of modules may be driven alternately and hence the diodes S1, on the one hand, or S2, on the other hand, that respectively generate the various lighting functions may be driven alternately. It is also possible to drive them simultaneously.

These diodes are mounted on a common printed circuit board. As described above with reference to FIG. 3, they are separated by a distance e from the optical axis of the lenses so as to obtain an angular spacing between the beams used for landing and the beams used for takeoff.

Of course, in the various envisioned embodiments, the scope of the disclosure is not departed from when a single light source S comprising two emissive zones S' and S" is used to generate the two lighting functions.

Figure 6A:
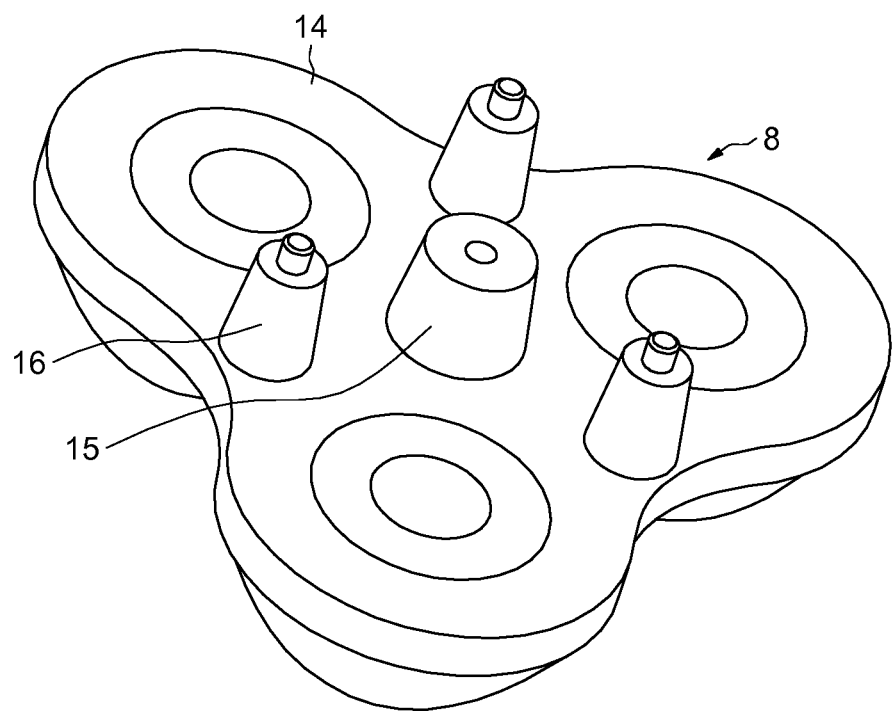
FIGS. 6a, 6b, 6c and 6d illustrate one embodiment of a lighting device integrating a plurality of lighting modules.
Figure 6B:
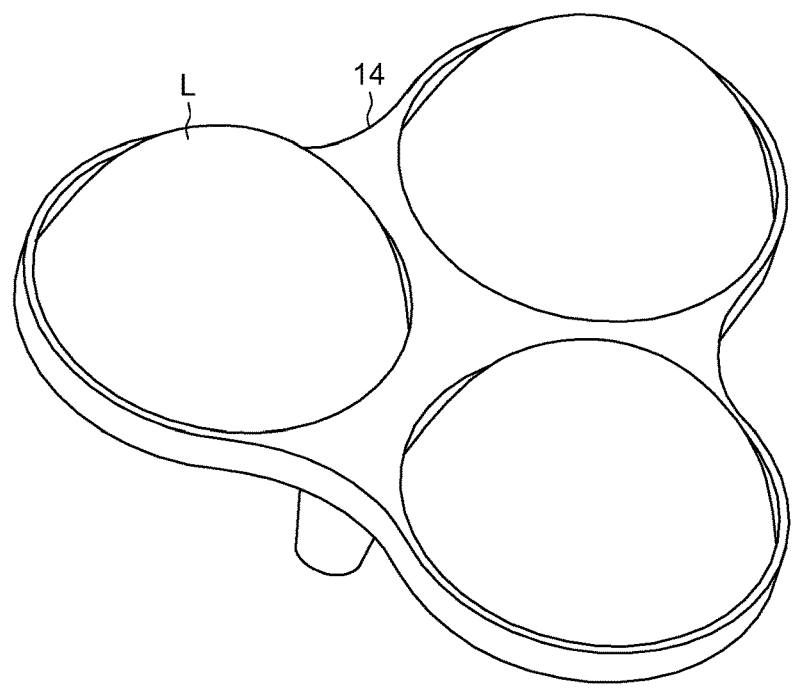
Figure 6C:
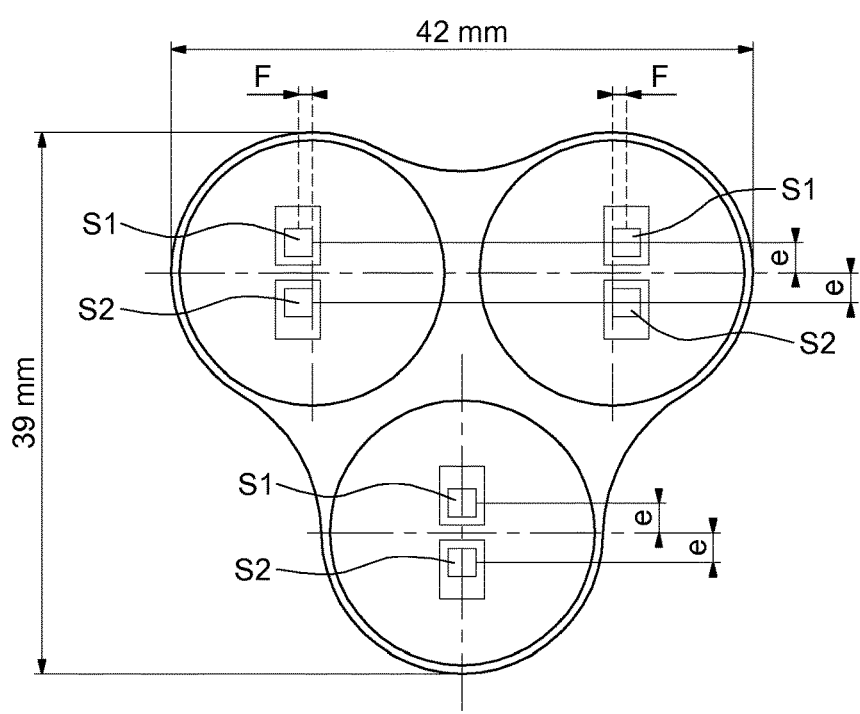
Figure 6D:
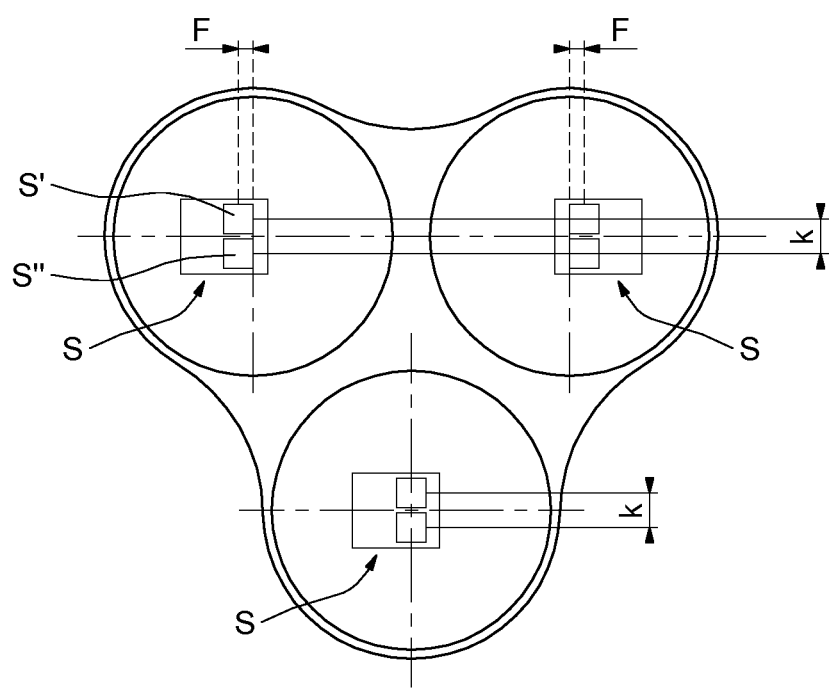

Thus, in the example embodiment illustrated in FIG. 6d, which corresponds to a lighting device comprising three lighting modules, each module comprises a single light source S, here a light-emitting diode, comprising two emissive zones S' and S" that are separated by a distance k and that may be powered independently of each other.

Preferably, each optical device has a central foot 15 for fastening the device to the printed circuit board and a plurality of centering feet, such as 16, here three in number, for, advantageously, precisely positioning the lenses facing the light sources.

It is advantageously possible, in various embodiments, to make the lenses from plastic molded so as to produce the feet, during the molding of the optical device.

For example, the lenses will possibly be made of any type of transparent plastic. Polycarbonate or polymethyl methacrylate (PMMA) will for example possibly be used.

In order to improve the optical efficacy of the lighting modules, the light sources may advantageously be placed close to the entrance face of the lens in order to increase the captured flux. It is a question, in other words, of defocusing the light sources by shifting them, with respect to the focal point of the lenses, on the side of the entrance dioptric interface.

It will be noted that the use of light sources comprising two emissive zones, i.e. two for each diode, is advantageous in so far as it allows emissive zones that are very closely spaced from each other, for example by a distance of about 0.1 millimeter, to be obtained, this allowing beams having a small angular offset to be produced.

However, the use of two diodes to produce each light source is also advantageous in so far as it allows the separation of the diodes to be specified in order to finely set the angle between the beams depending on the requirements of aircraft manufacturers and also to allow the same item of equipment to be adapted to a number of different aircraft.

It will also be noted that it is possible to place the light sources of the modules off-axis in order to create a beam that is slightly or largely oval-shaped.

Provision will for example possibly be made to position the sources of some of the lighting modules of the light off-axis to the right and to position some other of the light sources of the lighting modules of the light off-axis to the left. Such off-axis positioning allows the images of the sources to be superposed in the central zone of the light without causing a substantial drop in peak intensity, and also a beam having a spread of a few degrees along the horizontal axis to be obtained.

In the example embodiments illustrated in FIGS. 6c and 6d, two of the 6 sources are shifted to the left by a value F with respect to the axis of the associated lens and two other sources of the six sources are shifted to the right by the same value F with respect to the axis of the associated lens.

The LEDs will possibly therefore be off-axis with respect to the axis of the lenses in two perpendicular directions, one the vertical in order to control or define the spacing of the 2 landing and takeoff beams, the other the horizontal in order to spread the beams or make them oval-shaped.

It has been observed that a lighting module produced according to the method of implementation of FIG. 3 allows an angular range ranging from 8 degrees to 12.2 degrees to be covered when two sources that are independently positioned off-axis with respect to the axis of revolution of the lens by a distance ranging from 0.8 to 1.2 mm are used.

The lens is also capable of producing two beams that are offset by 5.5 degrees when a light-emitting diode having two juxtaposed emissive zones distant by 0.55 mm from the axis of revolution of the lens is used.

By modifying the parameters of the lens, it is possible, with light-emitting diodes having two juxtaposed emissive zones distant by 0.55 mm from the axis of revolution of the lens, to produce beams offset by 6.4° or 7.2°. It is therefore possible to cover all of the angular range from 5.5° to 14° either by modifying the spacing of the sources for a given lens, or by modifying the parameters of the lens, or even using a light-emitting diode having two juxtaposed emissive zones.

It has also been observed that, with the embodiment of FIG. 4, two beams covering an angular range ranging from 5.7 degrees to 12.2 degrees are also obtained with an improved luminous efficacy with respect to the embodiment illustrated in FIG. 3.

FIGS. 7 to 10 show iso-candela curves corresponding to the performance of the lights of FIGS. 1 and 2, when these lights are equipped with 96 diodes of 3 watts having an emissive area of 1 $mm^2$ and delivering a flux of 230 lumens and the 16 optical devices thereof, here triple devices, incorporate lenses corresponding to the embodiment of FIG. 4.

Figure 7:
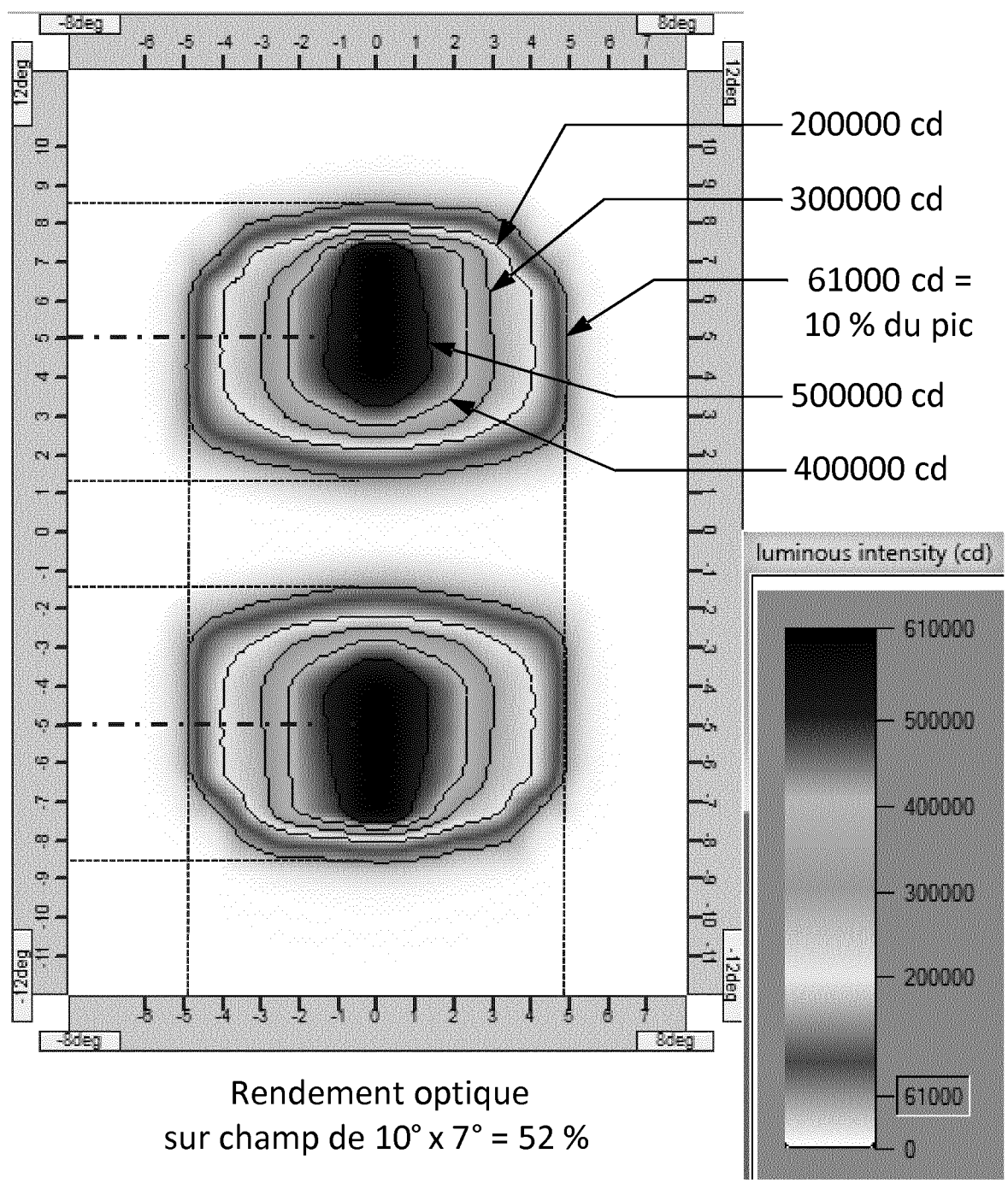
FIGS. 7 to 12 illustrate the light intensity produced by a double- or triple-function light according to the disclosure with the same lens.

FIG. 7 illustrates a map of the intensities obtained when the two landing and takeoff beams are in action, i.e. when the 96 diodes are all simultaneously turned on. The angular offset of the two beams, of 10 degrees, is obtained with a spacing of the center of the emissive zones of 2 mm.

Figure 8:
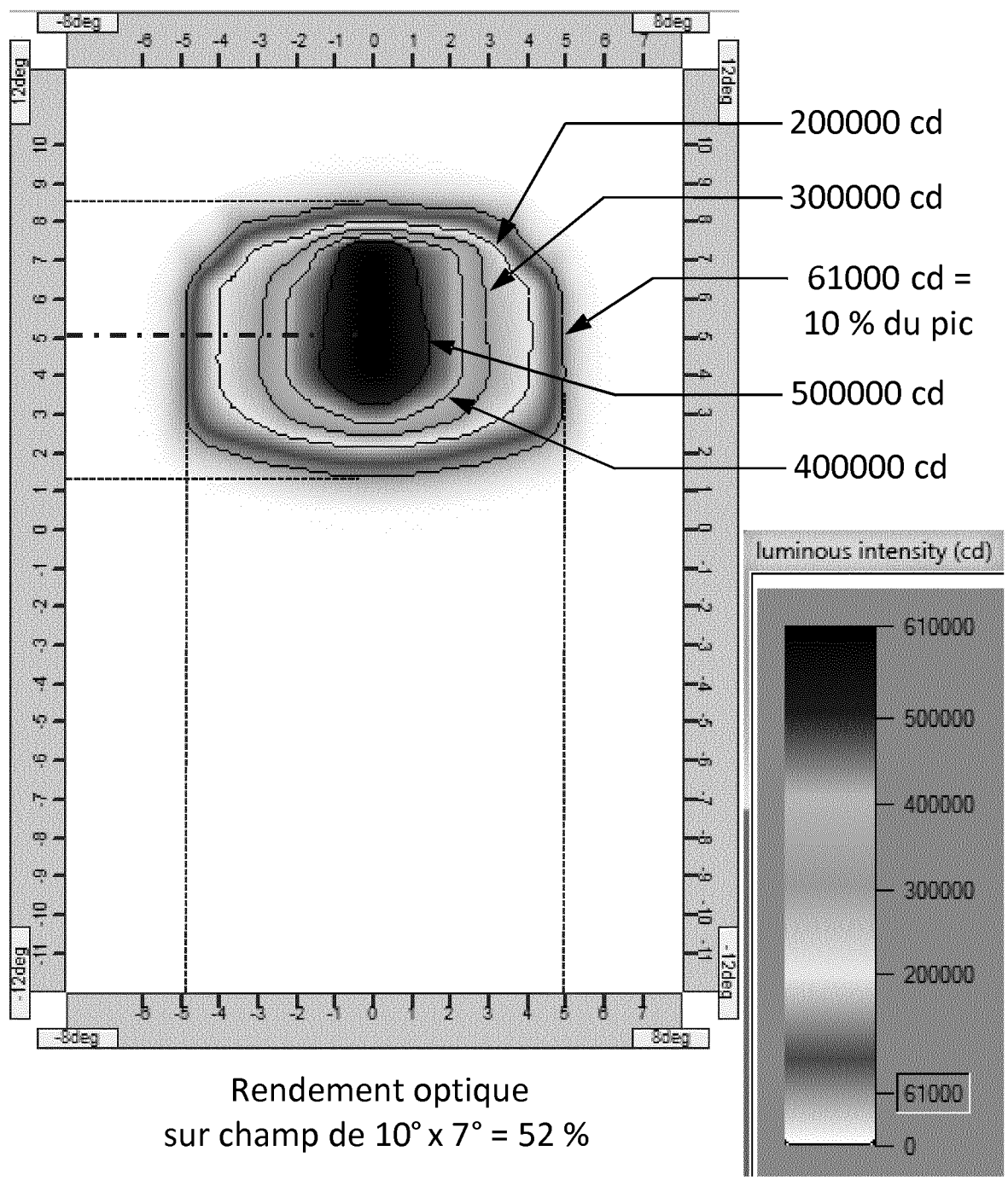

FIG. 8 shows a map of the intensities obtained when only the takeoff beam is turned on, i.e. when 48 diodes are turned on.

Figure 9:
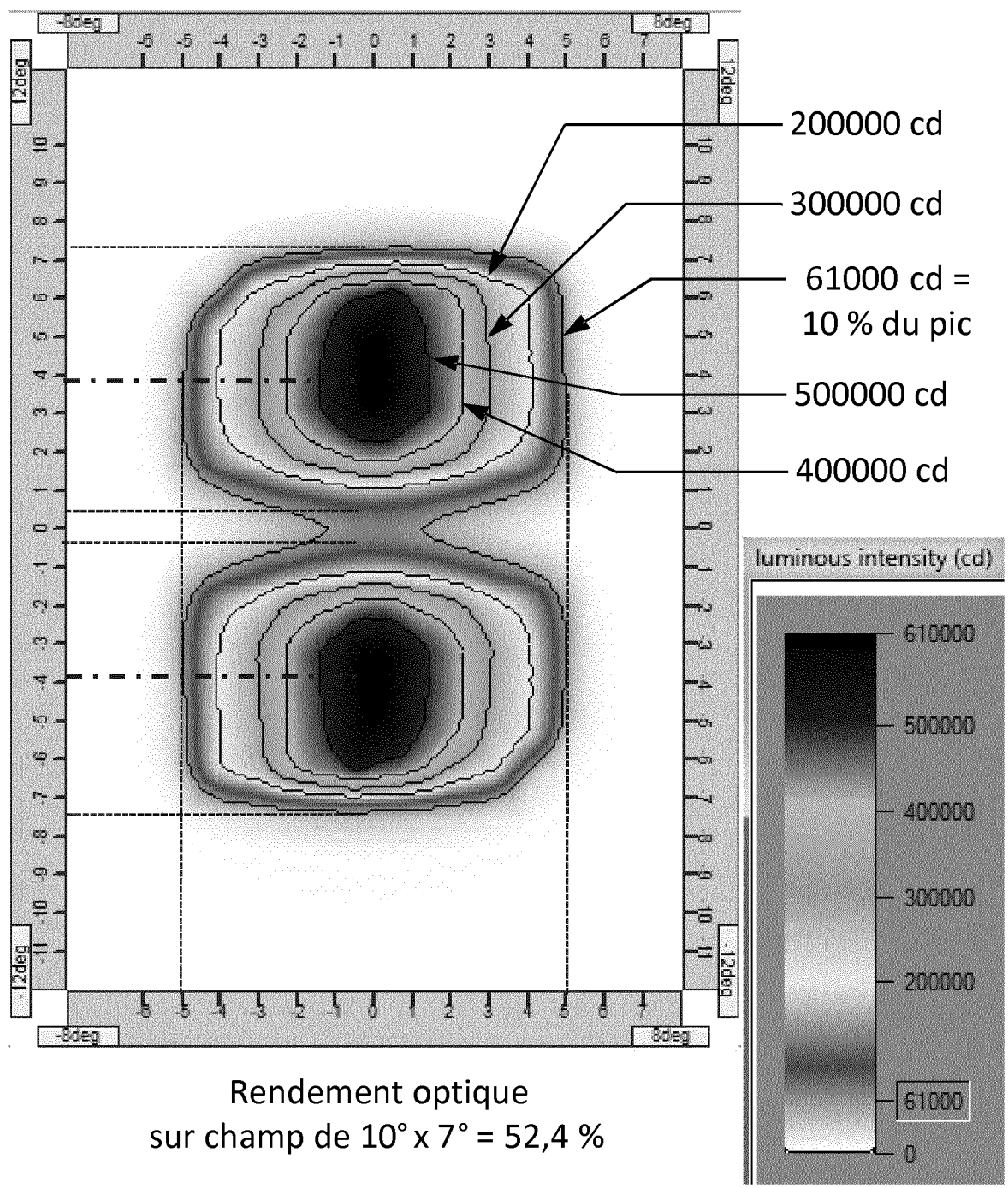

FIG. 9 shows a map of the intensities of two landing and takeoff beams offset by 7.8 degrees, corresponding to a spacing of the center of the emissive zones of 1.6 mm.

Figure 10:
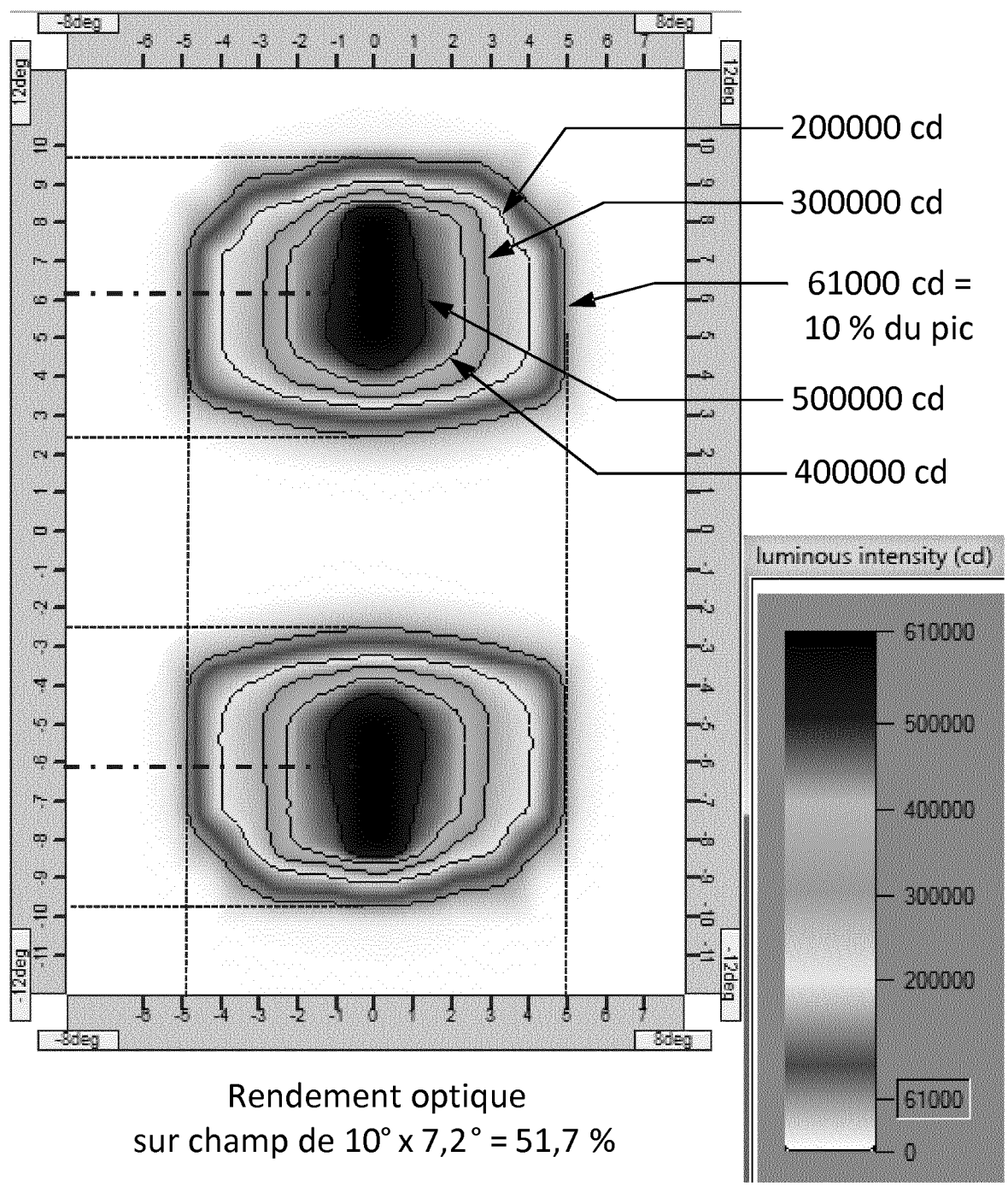

FIG. 10 shows a map of the intensities of two landing and takeoff beams offset by 12.2 degrees, corresponding to a spacing of the center of the emissive zones of 2.4 mm.

The results illustrated in FIGS. 7 to 10 correspond to diodes placed as described above with reference to FIG. 6c, a third of the diodes being placed off-axis to the left by a value "F" of 0.375 mm with respect to the axis of revolution of the lenses and another third of the diodes being placed off-axis to the right by the same value "F" equal to 0.375 mm, allowing oval-shaped beams of 10 degrees by 7 degrees, considered at 10% of peak value, to be obtained.

The optical efficiency of the light, including the consumption of the exit outer lens made of polycarbonate, remains almost constant for these three beam offsets (7.8 degrees/10 degrees/12.2 degrees) as does the peak intensity and field.

Specifically, it has been observed that for a lens such as illustrated in FIG. 3, the efficiency remains comprised between 58 and 59%.

Figure 11:
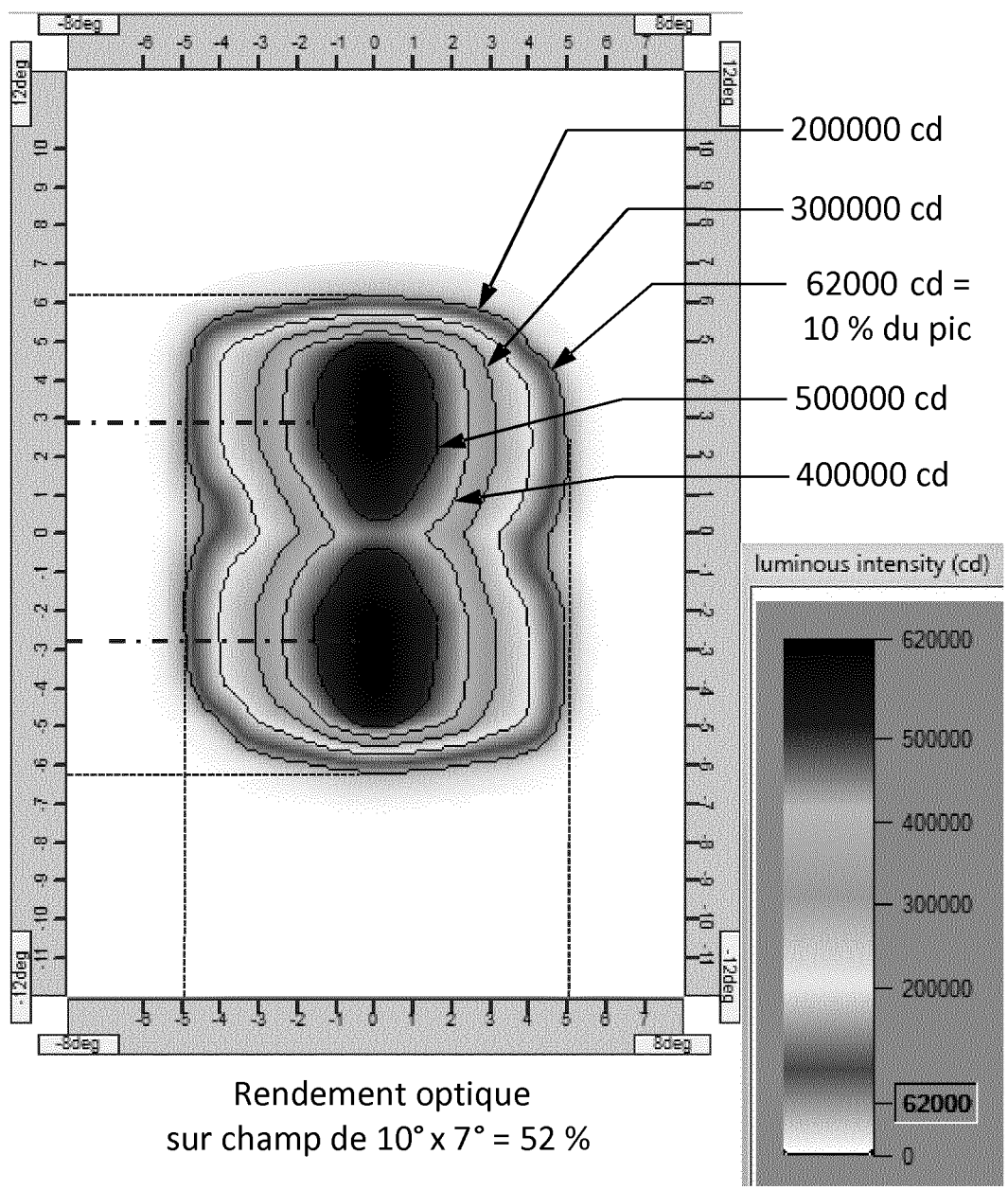
Figure 12:
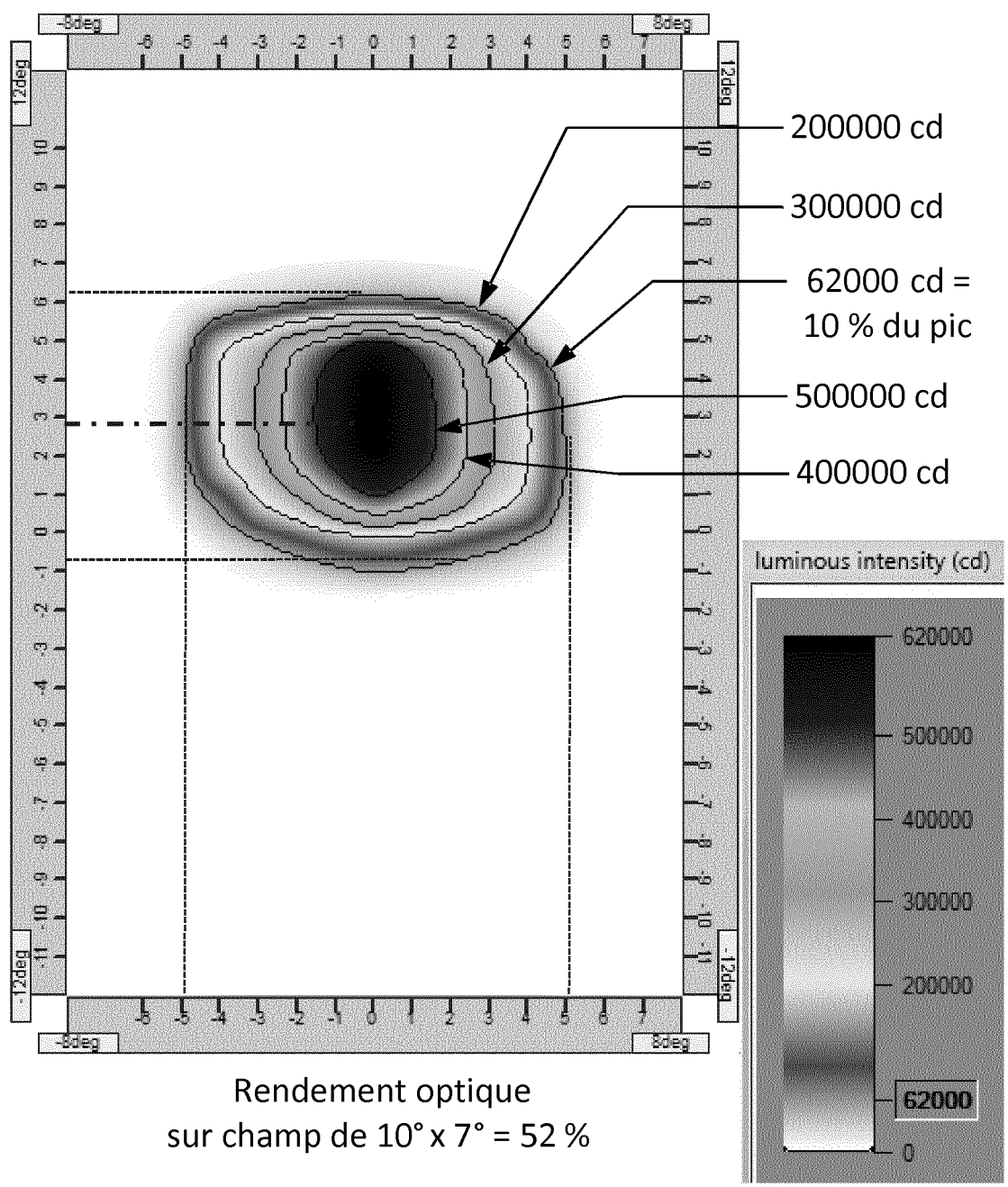

FIGS. 11 and 12 illustrate iso-candela curves corresponding to the performance of the lights of FIGS. 1 and 2 when these lights are equipped with 48 diodes comprising two juxtaposed emissive zones each of 1 mm$^2$ and delivering a flux of 225 lumens when they are supplied with 1 amp and the 16 triple optical devices thereof incorporate lenses corresponding to those described above with reference to FIG. 4.

FIG. 11 shows a map of the intensities of two landing and takeoff beams offset by 5.7 degrees, corresponding to a spacing of the center of the emissive zones of 1.1 mm.

FIG. 12 shows a map of the intensities obtained with the single takeoff beam turned on.

The results shown in these figures, FIGS. 11 and 12, correspond to diodes placed as described above with reference to FIG. 6d. In other words, a third of the diodes are positioned off-axis to the left by a value "F" equal to 0.375 mm with respect to the axis of revolution of the lenses and another third of the diodes are positioned off-axis to the right by the same value "F", allowing oval-shaped beams of 10 degrees×7 degrees to be obtained.

It will lastly be noted that the invention disclosure is not limited to the embodiments described above.

Specifically, in the example embodiments described with reference to FIGS. 6c and 6d, each lighting module of the lighting device comprises two light sources S1 and S2 capable of generating two or three functions.

Figure 13:
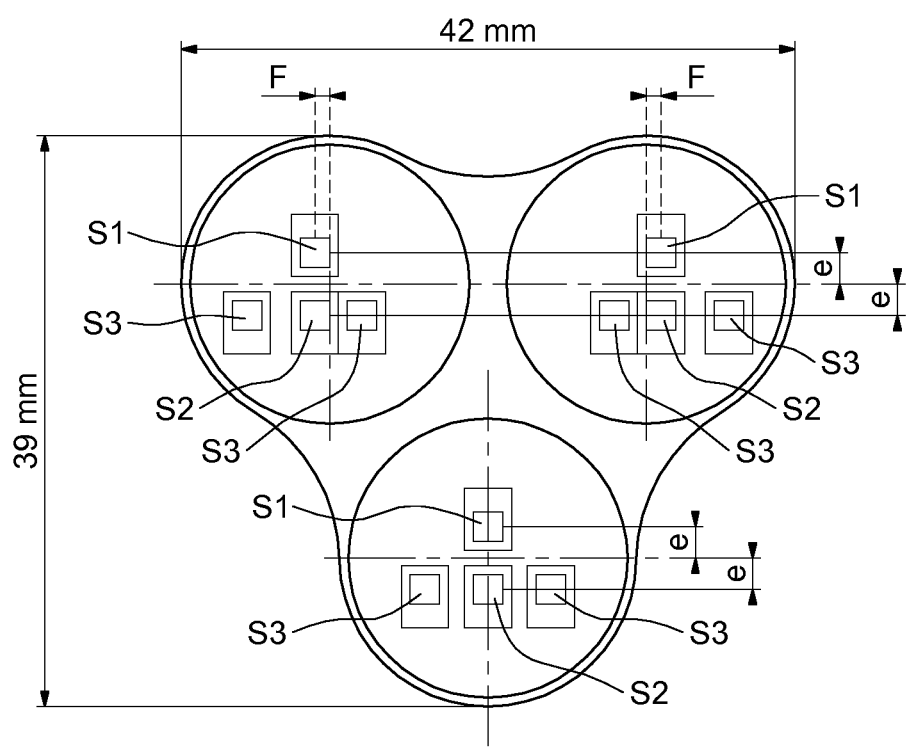
FIG. 13 illustrates yet another example embodiment of a lighting device according to the disclosure.
Figure 14:
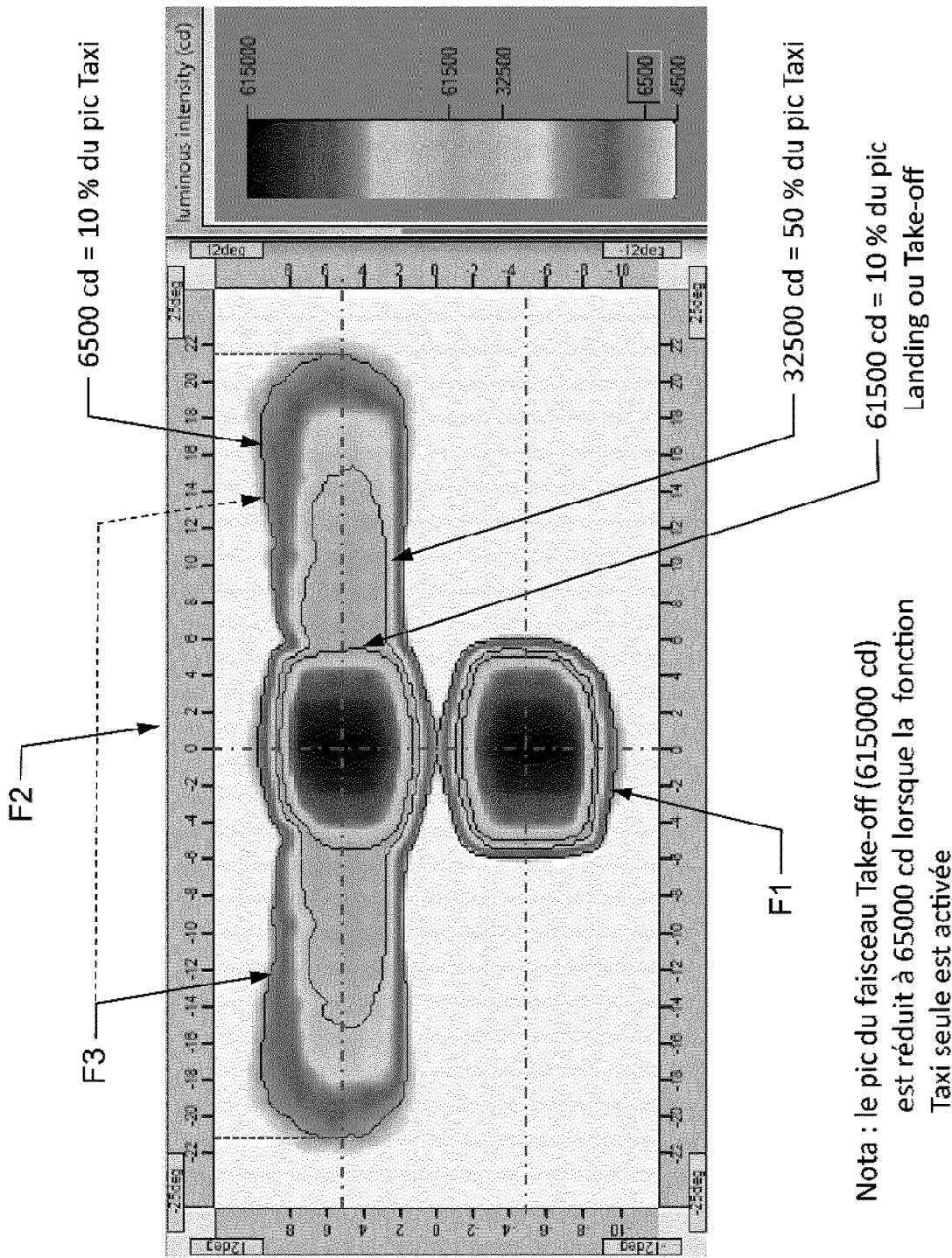
FIG. 14 shows the light intensity produced by a slight equipped with lighting devices according to FIG. 13.

It is also possible, as a variant, as illustrated in FIG. 13, to equip each lighting module with four sources, namely a first source S1, a second source S2 and two additional sources S3.

For example, the first source S1 on the one hand and the other sources S2 and S3 on the other hand are positioned off-axis by a distance "e" with respect to an optical axis of the lens.

The sources are also shifted, as described above with reference to FIGS. 6c and 6c, to the left and to the right so as to spread the beams or make them oval-shaped.

By selectively turning on the sources S1, S2 and S3, three functions are obtained that may be implemented selectively or simultaneously.

The sources S1 form the landing beam F1, the sources S2 form the takeoff beam F2 and, regarding 12% thereof, the taxiing beam and the sources S3 form the sides of the taxiing beam F3.

Specifically, 12% of the diodes S2 of a light remain turned on when the takeoff beam is turned off and the taxiing beam turned on because they form the center of the taxiing beam.

It will lastly be noted that the invention disclosure that has just been described allows lighting devices of small frontal size to be obtained and thus lights of any shape, suitable for the space available in the interior of the wings of aircraft, to be created and more particularly the size of the transparent porthole integrated into the wing root or the leading edge of the wings to be optimized. In particular, a multifunction light produced according to the teaching of the invention disclosure has substantially the same frontal dimensions as a single of the lights that it is intended to replace.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. An aircraft landing light with static function switching, intended to produce at least two beams having different characteristics, comprising: an array of LED lighting modules each comprising at least two sets of at least one selectively and statically activatable light source in order to generate at least one of the lighting functions, each LED lighting module comprising a convergent lens that is common to two light sources of the respective LED lighting module, the convergent lens possessing an entrance dioptric interface the profile of which is planar or spherical on the whole and an exit dioptric interface the profile of which is elliptical or aspherical, said two light sources being positioned with respect to the light entrance dioptric interface, wherein a focal plane of the convergent lens is located at a distance from the entrance dioptric interface smaller than 10 mm.

2. The light as claimed in claim 1, wherein the two light sources are off-axis with respect to an axis of the lens so as to generate either beams of different orientation or beams of different aperture, or beams of different orientation and aperture, the two light sources being off-axis with respect to the axis of the lens so that the beams mutually diverge by 5 to 30°.

3. The light as claimed in claim 1, wherein the entrance dioptric interface has a shape that is planar on the whole and comprises a disk-shaped central dioptric area, an annular exterior dioptric area and a frustoconical toroidal median area placed between the central and exterior areas.

4. The light as claimed in claim 1, wherein the two light sources are defocused with respect to the lens by being brought closer to the entrance dioptric interface.

5. The light as claimed in claim 1, wherein the lens is catadioptric and comprises a dioptric central zone in which the two light sources are placed and a conical or parabolic exterior annular zone that reflects light by total reflection.

6. The light as claimed in claim 1, wherein the two light sources are mounted on a printed circuit board and wherein the lens comprises feet for fastening and positioning the lens on the board.

7. The light as claimed in claim 6, comprising an optical device comprising a set of grouped convergent lenses each associated with the at least two sets of at least one light source.

* * * * *